United States Patent
Kudryavtsev et al.

(10) Patent No.: US 10,434,497 B2
(45) Date of Patent: Oct. 8, 2019

(54) METHOD OF PRODUCING INORGANIC SORBENTS FOR EXTRACTING LITHIUM FROM LITHIUM-CONTAINING NATURAL AND TECHNOLOGICAL BRINES

(71) Applicants: Pavel Kudryavtsev, Haifa (IL); Nikolai Kudriavtsev, Haifa (IL); Joseph Kristul, Daly City, CA (US)

(72) Inventors: Pavel Kudryavtsev, Haifa (IL); Nikolai Kudriavtsev, Haifa (IL); Joseph Kristul, Daly City, CA (US)

( * ) Notice: Subject to any disclaimer, the term of this patent is extended or adjusted under 35 U.S.C. 154(b) by 62 days.

(21) Appl. No.: 15/841,760

(22) Filed: Dec. 14, 2017

(65) Prior Publication Data

US 2019/0184373 A1    Jun. 20, 2019

(51) Int. Cl.

| | |
|---|---|
| *B01J 20/02* | (2006.01) |
| *B01J 20/04* | (2006.01) |
| *B01J 20/06* | (2006.01) |
| *B01J 20/30* | (2006.01) |
| *C02F 1/42* | (2006.01) |

(52) U.S. Cl.
CPC ....... *B01J 20/3028* (2013.01); *B01J 20/0214* (2013.01); *B01J 20/04* (2013.01); *B01J 20/06* (2013.01); *B01J 20/3078* (2013.01); *B01J 20/3085* (2013.01); *C02F 1/42* (2013.01)

(58) Field of Classification Search
CPC .... B01J 20/0211; B01J 20/0214; B01J 20/04; B01J 20/041; B01J 20/043; B01J 20/06; B01J 20/3028; B01J 20/3078; B01J 20/3085
See application file for complete search history.

(56) References Cited

U.S. PATENT DOCUMENTS

| | | | | |
|---|---|---|---|---|
| 2,881,156 | A * | 4/1959 | Pilar | C08F 10/00 502/125 |
| 6,689,716 | B2 * | 2/2004 | Sabacky | B01J 37/0009 502/351 |
| 8,629,080 | B2 * | 1/2014 | Bourane | B01J 23/20 502/208 |
| 8,901,032 | B1 | 12/2014 | Harrison et al. | |

FOREIGN PATENT DOCUMENTS

| | | |
|---|---|---|
| CN | 101944600 A | 1/2011 |
| RU | 1524253 | 2/1994 |
| WO | 2003041857 | 5/2003 |

OTHER PUBLICATIONS

Higher Education Institutions (Izvestiya Vuzov) "Non-ferrous Metallurgy" (Tsvetnaya metallurgiya), 1978, No. 3, pp. 50-53, P. Kudryavtsev, et al.

* cited by examiner

*Primary Examiner* — Cam N. Nguyen

(57) ABSTRACT

Disclosed is a method of producing inorganic sorbents for extracting lithium from lithium-containing natural and technological brines. The method is carried by contacting a soluble niobate (V) with an acid in the presence of at least one zirconium (IV) salt to obtain a precipitate of a mixed hydrated niobium and zirconium oxide. Subsequent steps include granulating the precipitate by freezing, converting the product of granulation into a Li-form, calcining the Li-form, and converting the obtained granulated mixed lithium, niobium, and zirconium oxide into an ion-exchanger in an H-form. In the obtained H-form the inorganic sorbent is ready for use in lithium extraction processes.

18 Claims, 2 Drawing Sheets

METHOD OF PRODUCING INORGANIC SORBENTS FOR EXTRACTING LITHIUM FROM LITHIUM-CONTAINING NATURAL AND TECHNOLOGICAL BRINES

FIELD OF THE INVENTION

The invention relates to the field of chemical technology, namely, to the production of selective inorganic sorbents for the extraction of lithium from lithium-containing natural and technological brines and can be used in the extraction of lithium from alkaline and slightly alkaline solutions with a high content of sodium ions and ions of other metals. In particular, the invention relates to the aforementioned method, which is carried out in the presence of oxidizing or reducing agents and by using ion sieves.

DESCRIPTION OF THE PRIOR ART

Lithium is historically extracted from two different sources—continental brines and minerals of hard rocks. At the present time, lithium finds use in the production of glass, ceramics, medical substances, metallurgical products, as well as in such fields as nuclear energy, aviation, etc. Demand for lithium will certainly grow when vehicles become greener, and electricity becomes cleaner. World sales of lithium salts currently amount more than $1 billion a year, because this element becomes an important component of lithium-ion batteries, which now feed everything from electric cars to power tools and smartphones.

According to forecasts, over the next eight years the demand for lithium will increase by more than 300%. Nevertheless, whenever larger electric companies expand the power of solar energy, demanding the storage of high-density energy Li-ion batteries, the demand for lithium can skyrocket. As an example, Duke Energy (one of the world leaders in production of energy) currently stopped the proposed nuclear power plant in Florida and instead plans to invest in a $6 billion solar and battery infrastructures. The ever-increasing demand for batteries and the need to store high-density energy created an acute dependence of many industries of the world industry on lithium, which triggered a global search for new lithium sources.

Nowadays, hydro-mineral raw materials gradually become the main source of lithium. The main attention is paid to the development of methods for processing lithium-containing hydromineral raw materials. The most commonly used in practice is a method of extracting lithium from natural brines by precipitation of sparingly soluble salts. However, from an ecological point of view, more promising are sorption methods of extraction of lithium from natural and technological brines that are poor in lithium content. In view of complexity of the salt composition of hydromineral raw materials, the use of highly selective inorganic ion-exchange materials is the most promising method for recovery of lithium.

Chinese Patent Application Publication CN101944600A published on Jan. 12, 2011 (Inventors: Xichang Shi, et Al.) discloses an ion sieve adsorbent for extraction of lithium ions based on lithium-titanium oxide and a method for preparing a precursor for this ion sieve adsorbent suitable for adsorbing enriched lithium from salt lake brines, seawater, and other liquid lithium resources. The method consists of using titanium dioxide and a lithium salt as raw materials, grounding the raw material in a ball grinder, and drying the grounded product for preparing lithium titanate as the aforementioned precursor through a high-temperature solid-phase roasting process. The lithium is then eluted from the precursor ($Li_2TiO_3$) by inorganic acid to prepare an ion sieve $H_2TiO_3$. According to a preferred embodiment, the process is based on a molar ratio of lithium to titanium of 2:1; anhydrous ethanol or acetone is used as a dispersion medium; grinding is carried out in a ball mill from 2 to 3 hours; the grounded product is calcined at 800° C. for 12 hours; and a lithium $Li_2TiO_3$ adsorbent is obtained.

U.S. Pat. No. 8,901,032 issued on Dec. 2, 2014 to Stephen Harrison, et al. discloses a method for producing a porous adsorbent based on activated alumina for lithium extraction. The method is carried out by contacting a three-dimensional activated alumina with a lithium salt under conditions sufficient to infuse lithium salts into activated alumina for the selective extraction and recovery of lithium from lithium-containing solutions, including brines. Lithium intercalated sorbent based on activated alumina provides a controlled and maximum permissible lithium to aluminum ratio, and a favorable structural shape and dispersed composition, thereby providing increased throughput for extracting lithium. In certain embodiments, the lithium intercalated sorbent based on activated alumina has a molar fraction ratio of lithium to aluminum in the range of about 0.1 to 0.3, and preferably up to about 0.33. The ratio of lithium to alumina is critical in stabilizing the structural form of the material and maximizing the number of lithium sites available in the matrix for loading and unloading of lithium from the brine solution.

International Patent Application Publication No. WO2003041857 A1 published on May 22, 2003 (Inventor: Alexander Ryabstsev, et al.) relates to a method for producing granulated sorbents in the form of the double hydroxide of aluminum and lithium in a waste-free solid phase of aluminum hydroxide and lithium salts in a mixer, with subsequent continuous activation of crystalline DHAL-Cl in a centrifugal mill activator in order to obtain a defective crystalline structure. The obtained product is mixed with chlorinated polyvinyl chloride, as a binding agent, and with liquid methylene chloride. The granulated sorbent is suitable for selective extraction of lithium from chloride salt minerals with an extraction degree of 95%.

Also, known is Russian Patent No. 1524253 issued on Feb. 15, 1994 to Melikhov, et al. This patent relates to a method of ion exchange removal of lithium from solutions. The method includes the steps of passing the solutions through a sorption material consisting of a sorbent selective to lithium and based on manganese oxides or manganese and aluminum oxides in a hydrogen form and an auxiliary sorbent in a salt form, followed by their regeneration, respectively, with a solution of nitric acid and alkaline solution. The method is characterized in that, in order to increase the degree of lithium recovery from the natural and technological brines, as well as the degree of regeneration of the auxiliary sorbent and the reduction of the regeneration time, the sorbent is selective to lithium in an alkaline medium based on titanium hydroxide, the transmission is conducted through alternating layers of the selective and auxiliary sorbents, and the regeneration of the auxiliary sorbent is carried out with the original lithium solution at pH 12-13. A hydrated titanium dioxide or a mixed hydroxide of titanium and iron is used as an auxiliary sorbent. A disadvantage of this method is that the obtained sorbent has low stability in the presence of oxidants or reducing agents.

In Transactions of Higher-Education Institutions (Izvestiya Vuzov) "Non-ferrous Metallurgy" (Tsvetnaya metallurgiya), 1978, No. 3, pp. 50-53, P. Kudryavtsev, et al. disclose an inorganic ion-exchanger ISN-1 selective to ions of lithium. What is disclosed in this publication, is a method of obtaining an inorganic sorbent for extracting lithium from natural and technological brines. The method involves contacting the soluble niobates (V) with an acid, granulating the resulting precipitate, transferring the obtained product to calcining at an elevated temperature, and then converting the product into an H-form.

SUMMARY OF THE INVENTION

The method of the invention is intended for producing an inorganic sorbent for extracting lithium from natural and technological brines and relates to the field of chemical technology, namely, to the production of inorganic sorbents selective to certain ions.

An objective of the invention is to increase the selectivity and exchange capacity of sorbents to lithium on the basis of niobium oxide, as well as to improve chemical stability of such sorbents in cyclic operations.

As mentioned above, the known method of P. Kudryavtsev, et al. involves contacting a soluble niobate (V) solution with an acid to form a precipitate, which is comprised of a mixed hydrated niobium and zirconium oxide. The obtained product is frozen and then defrosted for obtaining a granulated mixed hydrated niobium and zirconium oxide. The following steps include subsequent transfer of the material to washing with a solution of lithium carbonate, calcining the granulated mixed hydrated niobium and zirconium oxide to obtain a granulated mixed lithium, niobium, and zirconium oxide, and transferring the finished product to an H-form by washing with the solution of the acid. The method of the invention differs from the aforementioned conventional method by conducting a reaction of niobates (V) with an acid in the presence of zirconium (IV) salts and at a ratio of niobium (V) to zirconium (IV) in a solution in the range of 1:(0.1 to 0.7). The obtained lithium-form material is calcinated at a temperature in the range of 450° C. to 600° C., and the finished product is then treated with an acid solution, e.g., a nitric acid solution, whereby a target product, i.e., a hydrogen-form sorbent is obtained. Primary area of use: extraction of lithium from complex natural and technological brines including those, which contain oxidants and reducing agents, as well as radioactive elements.

DETAILED DESCRIPTION OF THE INVENTION

Figure 1:
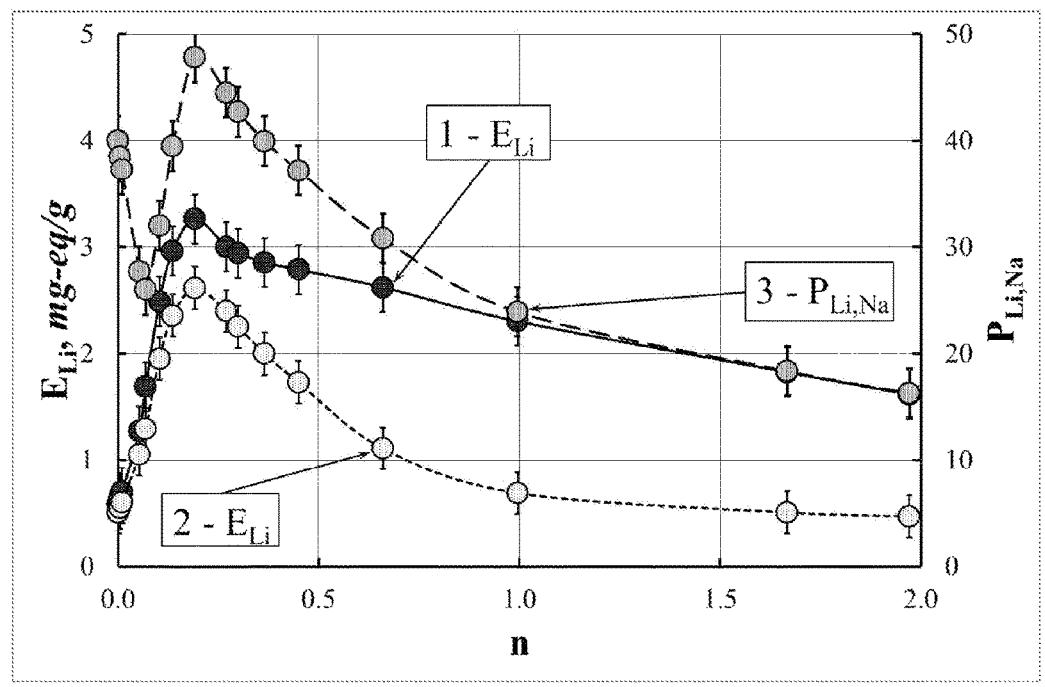
FIG. 1 is a graph that shows dependence of the capacitance on lithium ($E_{Li}$) and an effect of the ion separation factor in lithium and sodium ($P_{Li,Na}$) on the content in the sorbent of zirconium ions.

The invention relates to the field of chemical technology, namely, to the production of selective inorganic sorbents for the extraction of lithium from natural and technological brines. The invention may be used in the extraction of lithium from alkaline and slightly alkaline solutions with a high content of sodium ions and ions of other metals. In particular, the invention relates to the aforementioned method, which is carried out in the presence of oxidizing or reducing agents and by using ion sieves.

The term "brines" used in the context of the present patent specification covers any natural or technological solutions that contain lithium.

Ionic sieves are inorganic ion-exchange sorbents that exhibit the so-called ion-sieve effect, which is the effect of separation of ions in a solution in accordance with the difference in their ionic radii. Dimension positions in crystal structure of the material corresponds to certain ions, and ions of a larger size cannot enter unspecified positions. Thus, the ion-sieve effect provides high selectivity in the sieve-effect sorbents. A unique feature of the method of the present invention is that the method makes it possible to obtain inorganic ion-exchange sorbents with a specific structure that provides high selectivity especially to lithium ions.

It is also important to note that in the context of the present specification the term "mixed hydrated niobium and zirconium oxide" does not mean a mechanical mixture of the hydrated niobium oxide with a hydrated zirconium oxide but rather means a chemical compound of a non-stoichiometric composition.

The objective of the invention is to increase the exchange capacity of the sorbent and its selectivity with respect to lithium ions.

The objective is achieved by a method of obtaining an inorganic sorbent for extracting lithium from lithium-containing natural and technological brines. The method consists of contacting soluble niobates (V) with an acid in the presence of zirconium (IV) salts at an atomic niobium/zirconium ratio in the range of 1:(0.1 to 0.7) to obtain a mixed hydrated niobium and zirconium oxide, which is then granulated and subsequently converted into a lithium-form sorbent (hereinafter referred to as a sorbent). The granulation is carried out by freezing the obtained precipitate at a temperature of −5 to −7° C. for 24 to 30 hours with subsequent defreezing.

This conversion is carried out by treating the obtained product with a lithium-containing compound selected from the group consisting of a solution of lithium hydroxide LiOH and a solution of lithium carbonate $Li_2CO_3$. As a result, a Li-form of a granulated mixed hydrated niobium and zirconium oxide is obtained.

The obtained Li-form is calcined at an elevated temperature, specifically at 450÷600° C., the finished product is then treated with an acid solution, e.g., a nitric acid solution, to obtain a target product, i.e., a hydrogen-form sorbent (hereinafter referred to as an H-form sorbent).

Soluble niobates suitable for use in the method of the invention are represented by alkali metal orthoniobates, such as $Li_3NbO_4$, $Na_3NbO_4$, $K_3NbO_4$, $Rb_3NbO_4$, $Cs_3NbO_4$.

Zirconium salts suitable for the method of the invention can be exemplified by $ZrCl_4$, $ZrBr_4$, $ZrI_4$, $ZrOCl_2$, $ZrOI_2$, $Zr(SO_4)_2$, $Zr(NO_3)_4$.

Examples of H-form sorbents are given below in Table 1 (the Li-forms are similar and therefore are not included).

Uniqueness of the proposed method lies in the fact that the step of contacting a soluble niobate (V) with an acid is carried out in the presence of zirconium (IV) salts and in that the ionic ratio of niobium (V) to zirconium (IV) in their interaction ranges from 1 to (0.1÷0.7). Another feature is that calcination of the precipitate in the Li form is carried out at a temperature in the range of 450 to 600° C.

The method is carried out as follows:

In the first step, a mixed hydrated niobium (V) and zirconium (IV) oxide is produced by contacting a soluble niobate (V) with an acid solution that contains zirconium salts. To obtain a mixed hydrated niobium (V) and zirconium (IV) oxide, a process of coprecipitation is used. This process is carried out by pouring an acid solution of zirconium salts into a solution of a soluble niobate. For this purpose, solutions of hydrochloric acid, nitric acid or sulfuric acid can be used. To carry out this process, acids may have concentration in the range of 0.5 to 1.0 N. Zirconium compounds may be represented by aforementioned zirconium salts.

The step of pouring is accompanied by stirring. The content of the components in the miscible solutions is taken at a level providing a ratio of zirconium (IV) to niobium (V) in the range of (0.1 to 0.7) to 1 and obtaining suspensions with pH=5 to 6.

An excess of the resulting electrolyte is washed out from the obtained precipitate of a mixed hydrated niobium and zirconium oxide by successive decantation. The obtained precipitate of the mixed hydrated niobium and zirconium oxide is granulated by freezing, and then the granulated product is defrosted. The step of freezing is carried out for 24 to 30 hours at a temperature of −5 to −7° C. After defreezing, a granular material with a particle size of 0.3 to 1.0 mm is obtained.

The resulting granular material is placed in an ion-exchange column and treated with a solution of lithium carbonate or lithium hydroxide at a concentration of 0.05 to 0.1 M until no traces of potassium are found in the filtrate. As a result, a product saturated with lithium ions is obtained. The obtained product is comprised of a lithium-saturated granulate, which is discharged from the column, dried in air, and calcined at a temperature in the range of 450 to 600° C. for 2 to 3 hours. After cooling and transferring to the H-form (by treating with 0.1÷0.2 M $HNO_3$), the obtained ion exchanger is ready for sorption of lithium ions.

The above conditions for obtaining the sorbent allow to synthesize an ion exchanger, which has increased chemical stability, high exchange capacity, and efficient selectivity to lithium ions.

An optimal ratio between niobium and zirconium in the material is chosen on the basis of the experimental data obtained in studying the dependence of the exchange capacitance of the sorbent on lithium and the separation coefficient for lithium and sodium ions on the content of zirconium ions in the sorbent (FIG. 1).

FIG. 1 shows dependence of the capacitance on lithium ($E_{Li}$) and the separation factor for the ion in lithium and sodium ($P_{Li,Na}$) on the content in the sorbent of zirconium ions, where n=Zr (IV):Nb (V) is the ionic ratio in the sorbent. In this drawing, curve 1 corresponds to $E_{Li}$ obtained with the use of 0.1 N LiOH. Curve 2 corresponds to $E_{Li}$ obtained with the use of a solution of lithium and sodium salts at ionic ratio $Li^+:Na^+$=1:10, pH=12. Curve 3 corresponds to $P_{Li,Na}$ obtained with the use of a solution of lithium and sodium salts at ionic ratio $Li^+:Na^+$=1:10, pH=12. The calcination temperature of the samples is 520° C.

The obtained data shown in FIG. 1 indicate that the maximum value of the exchange capacity and selectivity to lithium ions is exhibited by materials whose composition corresponds to the ratio of niobium to zirconium in the range of 1 to (0.1 to 0.7).

To obtain such a composition, it is necessary to keep the ratio of the hydrated niobium oxide to the hydrated zirconium oxide in the solution the same as prior to mixing. In other words, the entire contents of the niobium and zirconium should transfer to a solid state contained in the precipitate.

Figure 2:
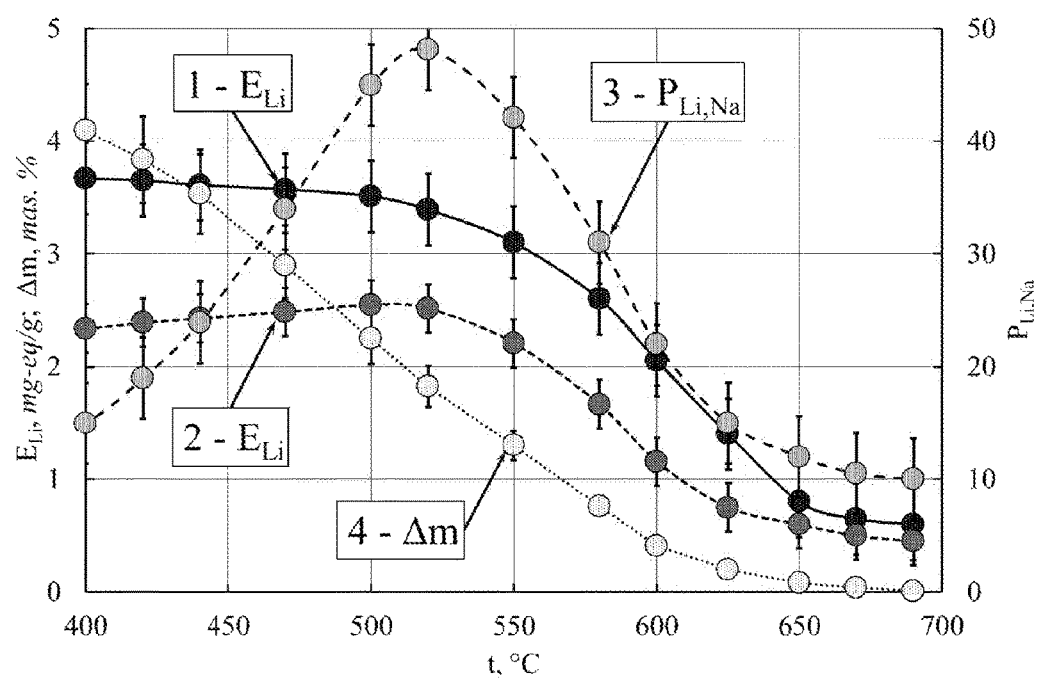
FIG. 2 is a graph illustrating the influence of the heat treatment temperature in the synthesis of the material, on the sorption-selective properties and the chemical stability of the sorption materials obtained.

The optimal conditions needed for heat treatment of the obtained granular material saturated with lithium ions were determined from the experimental data relating to sorption properties of sorbent samples prepared with a Zr (IV) to Nb (V) ratio equal in the solid phase to 0.30:1. The samples were calcined at different temperatures. The results are shown in FIG. 2, which illustrates the influence of the heat treatment temperature in the synthesis of the material on the sorption-selective properties and the chemical stability of the sorption materials obtained.

In the drawing, curve 1 corresponds to $E_{Li}$ obtained with the use of 0.1 N LiOH; curve 2 corresponds to $E_{Li}$ obtained with the use of a solution of lithium and sodium salts at ionic ratio $Li^+:Na^+$=1:10, pH=12; curve 3 corresponds to $P_{Li,Na}$ obtained with the use of a solution of lithium and sodium salts at ionic ratio $Li^+:Na^+$=1:10, pH=12; and curve 4 shows sorbent losses (Δm) per 1 work cycle in a solution of lithium and sodium salts at the ionic ratio $Li^+:Na^+$=1:10, pH=12.

The results of the experiments show that the optimum temperature for calcining the Li-form of the granulated mixed hydrated niobium and zirconium oxide to obtain a granulated mixed lithium, niobium, and zirconium oxide (i.e., a tripled mixed oxide, which is a Li-form of an inorganic ion exchanger) is in the range of 450° C. to 600° C. A time needed to keep the material at this temperature for the formation of the sorbent structure should be in the range of 2 to 3 hours. If heat treatment is carried out under these conditions, the obtained sorbent, which in this case possesses the ion-sieve effect, acquires a maximum exchange capacity and selectivity to lithium ions and is characterized by minimal losses in alternating sorption-desorption cycles.

The remaining operations of the proposed method for obtaining the granulated sorbent on the basis of precipitate of a mixed hydrated niobium and zirconium oxide and saturating the granulated material with lithium were carried out under the same conditions as in the method disclosed in the aforementioned article of P. Kudryavtsev, et al. More specifically, the cation exchanger ISN-1 was prepared by precipitation of hydrated niobium pentoxide (GPN) by mixing 0.1 M solutions of potassium niobate and hydrochloric acid, granulating the GPN, saturating the granular product with lithium ions from 0.05÷0.1 M solution of lithium carbonate, and then calcinating the product at 400±25° C. for 2÷3 hours. After calcination and conversion to the H-form (treatment with 0.1-0.2 M nitric acid solution), the sorbent was ready for lithium sorption. The obtained sorbent was suitable for extracting lithium from slightly alkaline solutions in the presence of both oxidizing agents and reducing agents.

The effectiveness of the proposed method is illustrated by the examples given below. It is understood, however, that these examples should not be construed as limiting the scope of the invention and that they are given only for illustrative purposes.

The following methods and instruments were used for processing the materials and measuring properties of the obtained products mentioned in the subsequent examples.

Equipment and Procedures Used in the Method of the Invention

Ion-Exchange Column

As ion-exchange column used in the method of the invention was a standard chromatographic column with a diameter of up to 10 mm. The height of the sorbent layer was maintained in the range of 10 to 15 column diameters. The solution was fed through the column at a constant linear speed, in the range of 1 to 10 mm/s. The feed rate of the solution was maintained by means of a peristaltic pump.

During sorption experiments, special measures were taken to prevent air from entering the sorbent layer and to partially dry the sorbent granules.

Determination of the Content of Lithium

Determination of lithium in solutions was carried out by the method of emission photometry of a flame. The most intense resonance line in the spectrum of lithium, 670.8 nm, was used for the analysis. This line corresponds to the transition between the energy levels $2^2S_{1/2}$ and $2^2P^0_{3/2}$ at the excitation energy of 1.85 eV. The sensitivity of the method, in determining lithium (with the use of the FLAME PHOTOMETER, FP8000 series device; A. KRÜSS Optronic), was 0.001-0.0005 μg Li/ml. The content of lithium was determined from the calibration based on reference solutions prepared based on pure metal salts and their mixtures present in the solutions under study, which were close in proportion to the test solutions. Determination of sodium content was carried out in a similar way.

Determination of the Content of Zirconium

Determination of the content of zirconium and niobium in the composition of the investigated sorbent samples was carried out by X-ray fluorescence spectroscopy. The experiments were performed on a VRA-30 spectrometer. The source of excitation was a tube with a tungsten anode, operating at U=30 kV, I=15 mA. A LiF single crystal was used as the analyzer crystal. The registration was carried out using a proportional counter.

The Determination of the Content of Niobium

The determination of the content of niobium was carried out along the line $K_{\alpha_{1,2}}$, the sensitivity of the method was 0.05%. Determination of the zirconium content was carried out along the line $K_{\alpha_1}$, the sensitivity of the method was 0.003%. The background in the analysis was taken into account by the method of linear interpolation and by using a blank sample. Samples of materials for X-ray fluorescence analysis were prepared by compressing them in the form of tablets with NaCl (S7653 SIGMA-ALDRICH 99.5% (AT)) at a pressure of 4000 kg/cm². The instrument was calibrated using samples containing fixed amounts of niobium pentoxide (203920 ALDRICH 99.99% trace metals basis) and zirconium dioxide (230693 ALDRICH 99% trace metals basis).

Sorption-Selective Parameters

The following characteristics are taken as parameters describing sorption-selective properties: a total exchange capacitance $E_{LiO}$, obtained by using 0.1 N LiOH solution as a sorbent; a selective lithium capacitance $El_{i1}$ used for sorption from a solution of lithium and sodium salts at an ionic ratio Li$^+$:Na$^+$ in the range of 1 to 10 at pH=12; and a coefficient $P_{Li,Na}$ of selectivity of the sorbent with respect to lithium, which is a direct parameter that characterizes separation of lithium from sodium and which is represented by the following formula:

$$P_{Li,Na} = E_{Li1} \cdot C_{Na} / E_{Na1} \cdot C_{Li},$$

where $E_{Li1}$ is a selective lithium capacity at sorption from a solution of lithium and sodium salts at ionic ratio Li$^+$/Na$^+$ of 1/10 at pH=12 (mg-eqv/g sorb.);

$E_{Na1}$ is a sodium capacity at sorption from a solution of lithium and sodium salts at ionic ratio Li$^+$/Na$^+$ of 1/10 at pH=12 (mg-eqv/g sorb.);

$C_{Li}$ is a molar concentration of Li$^+$ in a solution of lithium and sodium salts at ionic ratio Li$^+$/Na$^+$ of 1/10 at pH=12 (mol/l);

$C_{Na}$—molar concentration of Na$^+$ in a solution of lithium and sodium salts at ionic ratio Li$^+$/Na$^+$ of 1/10, pH=12 (mol/l).

EXAMPLES

Example 1

A predetermined amount of 0.05 M solution ZrOCl$_2$ in 1.0 M HCl is poured to 2.0 l of a 0.05 M solution of K$_3$NbO$_4$ (pH=12.7) with a vigorous stirring. The pH of the precipitation process is 5 to 6 (correction with HCl). The resulting precipitate of a mixed hydrated niobium and zirconium oxide is washed by successive decantations to a residual concentration of potassium ions equal to 0.08-0.09 g/l and then frozen at t=−6 C for about 30 hours. The freezing produces a granulated material. After thawing, the granulate is placed in an ion-exchange column, and about 4 l of a 0.1 M solution of Li$_2$CO$_3$ is passed. Next, the precipitate of the mixed hydrated niobium and zirconium oxide is discharged from the column, air-dried, then heated to the desired temperature (with a temperature increasing rate of 10 deg/min; specific temperatures are given below in Tables 1 and 2), and held at this temperature for 3 hours. As a result, a sorbent is obtained, the main fraction of which is a granule with a granule size of 0.2÷0.7 mm.

The effect of synthesis conditions in obtaining ion exchanger on its sorption properties is summarized in Table 1. This table presents results of tests of sorbents obtained at various conditions of synthesis but within the scope of the present invention. In the ion-exchange test, a solution of the following composition (g/l) is used: Li$_2$CO$_3$—5.5; NaCl: 53.0; NaOH—3.0 (pH=12.1).

TABLE 1

Influence of synthesis conditions on compositions and properties of sorbents (synthesis under conditions within the scope of the present invention)

| The sorbent obtaining conditions | | | Test results | | | |
|---|---|---|---|---|---|---|
| Zr(IV):Nb(V) ration in solution during synthesis | Treatment temperature T, °C. | Sorbent composition* | Total ion exchange capacity $E_{LiO}$, mg-eqv/g | Selective capacity by Li, $E_{Li1}$, mg-eqv/g | Li—Na separation coefficient, $P_{Li,Na}$ | Output of the working fraction (0.2 ± 0.7 mm), mass % |
| 0.191 | 520 | H$_{0.98}$NbO$_{2.99}$•0.191ZrO$_2$ | 3.39 | 2.52 | 48.2 | 96 |
| 0.010 | 520 | H$_{0.19}$NbO$_{2.59}$•0.191ZrO$_2$ | 0.70 | 0.60 | 37.3 | 96 |
| 0.053 | 500 | H$_{0.38}$NbO$_{2.99}$•0.053ZrO$_2$ | 1.41 | 1.14 | 27.7 | 94 |
| 0.069 | 400 | H$_{0.94}$NbO$_{2.97}$•0.069ZrO$_2$ | 3.41 | 1.57 | 20.0 | 91 |
| 0.069 | 550 | H$_{0.39}$NbO$_{2.69}$•0.069ZrO$_2$ | 1.41 | 1.06 | 25.0 | 96 |

TABLE 1-continued

Influence of synthesis conditions on compositions and properties of sorbents
(synthesis under conditions within the scope of the present invention)

| The sorbent obtaining conditions | | | Test results | | | |
|---|---|---|---|---|---|---|
| Zr(IV):Nb(V) ration in solution during synthesis | Treatment temperature T, ° C. | Sorbent composition* | Total ion exchange capacity $E_{LiO}$, mg-eqv/g | Selective capacity by Li, $E_{Li1}$, mg-eqv/g | Li—Na separation coefficient, $P_{Li,Na}$ | Output of the working fraction (0.2 ± 0.7 mm), mass % |
| 0.103 | 600 | $H_{0.35}NbO_{2.67} \cdot 0.103ZrO_2$ | 1.25 | 0.89 | 23.4 | 97 |
| 0.136 | 470 | $H_{0.80}NbO_{2.90} \cdot 0.136ZrO_2$ | 2.85 | 2.24 | 28.6 | 92 |
| 0.191 | 440 | $H_{1.04}NbO_{3.02} \cdot 0.191ZrO_2$ | 3.61 | 2.43 | 24.0 | 92 |
| 0.191 | 580 | $H_{0.75}NbO_{2.88} \cdot 0.191ZrO_2$ | 2.60 | 1.67 | 31.0 | 97 |
| 0.300 | 470 | $H_{1.05}NbO_{3.03} \cdot 0.300ZrO_2$ | 3.48 | 2.31 | 29.4 | 91 |
| 0.366 | 550 | $H_{0.91}NbO_{2.96} \cdot 0.366ZrO_2$ | 2.93 | 1.80 | 34.1 | 97 |
| 0.450 | 500 | $H_{1.05}NbO_{3.02} \cdot 0.450ZrO_2$ | 3.26 | 1.90 | 34.6 | 94 |
| 0.660 | 470 | $H_{1.10}NbO_{3.05} \cdot 0.660ZrO_2$ | 3.17 | 1.40 | 21.2 | 92 |
| 0.660 | 520 | $H_{0.91}NbO_{2.96} \cdot 0.660ZrO_2$ | 2.62 | 1.11 | 30.8 | 96 |

*The composition of the sorbent prepared for sorption of lithium (H-form)

Table 2 shows results of tests of sorbents obtained at various conditions of synthesis but beyond the scope of the present invention.

TABLE 2

Influence of synthesis conditions on the composition and properties of sorbents
(synthesis under conditions beyond the scope of the present invention)

| The sorbent obtaining conditions | | | Test results | | | |
|---|---|---|---|---|---|---|
| Zr(IV):Nb(V) ration in solution during synthesis | Treatment temperature T, ° C. | Sorbent composition* | Total ion exchange capacity $E_{LiO}$, mg-eqv/g | Selective capacity by Li, $E_{Li1}$, mg-eqv/g | Li—Na separation coefficient, $P_{Li,Na}$ | Output of the working fraction (0.2 ± 0.7 mm), mass % |
| 0.269 | 355 | $H_{1.09}NbO_{3.05} \cdot 0.269ZrO_2$ | 3.65 | 2.22 | 6.1 | 85 |
| 0.660 | 625 | $H_{0.40}NbO_{2.70} \cdot 0.660ZrO_2$ | 1.15 | 0.66 | 7.5 | 96 |
| 0.995 | 400 | $H_{1.20}NbO_{3.10} \cdot 0.995ZrO_2$ | 3.09 | 1.40 | 6.9 | 88 |
| 0.995 | 440 | $H_{1.16}NbO_{3.08} \cdot 0.995ZrO_2$ | 2.98 | 1.20 | 11.5 | 90 |
| 0.995 | 580 | $H_{0.73}NbO_{2.87} \cdot 0.995ZrO_2$ | 1.89 | 0.60 | 14.8 | 94 |

*The composition of the sorbent prepared for sorption of lithium (H-form)

It can be seen from the presented data that the total exchange capacity of the samples of the sorbents $E_{Li0}$ synthesized under conditions is 2.58±0.56 mg-eqv/g; the selective lithium capacitance is $E_{Li1}$ is 1.62±0.35 mg-eqv/g; the coefficient $P_{Li,Na}$ of selectivity of the sorbent with respect to lithium reaches values of PLi, Na=30±4, and its value for the optimum composition (i.e., for the conditions within the scope of the present invention) is $P_{Li,Na}$=48. For samples obtained outside the range of optimal conditions, these values are $E_{Li0}$=2.5±1.2 mg-eqv/g, $E_{Li1}$=1.2±0.8 mg-eqv/g, and $P_{Li,Na}$=9.4±4.6. These data show that obtaining of the sorbents under optimal conditions produce great results, over both the total exchange capacity and the selective capacity of lithium. The differences between optimal and non-optimal synthesis conditions are reflected especially noticeably on coefficient $P_{Li,Na}$ of selectivity of the sorbent with respect to lithium.

The advantages of the sorbent produced by the proposed method over the prototype are given in Table 3. Lithium sorption is carried out from the solution with the above composition. The elution of lithium from the sorbent is carried out with 0.1 N $HNO_3$ solution. The table shows average results for 5 cycles of sorbent operation.

Example 2

To compare the properties of the sorbents prepared by the method of the invention and conventional methods, weights of sorbents (50 g each) are placed in ion exchange columns with parameters of 3.2 cm²×30 cm. Sorption is conducted from a solution containing (g/l): $Li_2SO_4$—5.5; NaCl—56.0; NaOH—3.0; pH=12.1.

Tests of sorbents are carried out in the following sequence. The sorbents are loaded into columns and treated with solutions of $HNO_3$ at concentration of 0.2 mol/l. The columns are then washed with water until the reaction of media became neutral, and lithium is sorbed from the solutions of the above compositions (filtration rate: 40-60 ml/h, flowing volume: 1500-1600 ml). After sorption of lithium, the columns are washed with water (300-400 ml), and ion exchangers are regenerated under the action of 0.1-0.2 mol/l of $HNO_3$. At the regeneration stage, the filtration rate is maintained at about 100 ml/h, and 800-900 ml of the solution is passed. After completion of regeneration, the columns are washed with water until the media become neutral, and a new lithium sorption cycle is started. In total, during the tests, five sorption/desorption's cycles are conducted. The averaged test results are shown in Table 3.

TABLE 3

Sorbent Test Results with Model Solutions

| Sorbent | Exchange capacity, mg-eqv/g | | Li—Na separation coefficient, $P_{Li, Na}$ | Losses per one working cycle, % | Column Treated Volumes |
|---|---|---|---|---|---|
| | $E_{Li1}$ | $E_{Na1}$ | | | |
| According to the invention | 2.45 ± 0.20 | 0.35 ± 0.03 | 49 ± 5 | 1.8 | 95 ± 8 |
| Conventional | 1.42 ± 0.20 | 0.36 ± 0.04 | 38 ± 6 | 2.1 | 51 ± 7 |

As can be seen from Table 3, the sorbent obtained according to the proposed method has sorption-selective characteristics and chemical stability more than two times higher than the sorbent obtained by the known methods.

In the second series of tests, experiments are conducted for testing a synthesized sorbent by sorption from a natural underground brine of high mineralization. The brine has the following composition (g/l): $Li^+$—0.013; $Na^+$—76.0; $K^+$—2.7; $Mg^{2+}$—3.8; $Ca^{2+}$—19.5; $NH_4^+$—0.13; $Cl^-$—154; $Br^-$—0.7; $I^-$—0.01; $SO_4^{2-}$—0.12; $HCO_3^-$—0.07; pH=8.7. Prior to desorption, the sorbent is washed with a 0.1M $NH_4Cl$ solution to remove salting-out alkaline earth ions. The desorption is conducted with a solution of 0.1N $HNO_3$.

Comparative data on the characteristics of sorbents obtained by the known and proposed methods are presented in Table 4.

TAблица 4

Sorbent Test Results on Real Natural Brines

| Sorbent | Exchange capacity, mg-eqv/g | | Li—Na separation coefficient, $P_{Li, Na}$ | Losses per one working cycle, % | Column Treated Volumes |
|---|---|---|---|---|---|
| | $E_{Li1}$ | $E_{Na1}$ | | | |
| According to the invention | 2.55 ± 0.15 | 0.33 ± 0.08 | $(1.4 ± 0.2) \cdot 10^4$ | 1.1 | 4200 ± 200 |
| Conventional | 0.87 ± 0.11 | 0.18 ± 0.02 | $(0.9 ± 0.1) \cdot 10^4$ | 1.3 | 1800 ± 200 |

The technical and economic advantages of this method in comparison with the base object (the prototype method) are the following:
  increase in the sorption capacity for lithium and the selectivity of the sorbent to this metal in 1.8÷2.0 times; and
  20-25% improvement in the operating properties of the sorbent by reducing its losses in repeated cycles of sorption and desorption.

Thus, it has be shown that the sorbent obtained by the method of the invention is suitable for industrial production of lithium by extraction from complex natural and technological brines.

The method of the invention for obtaining inorganic sorbents for extracting lithium from natural and technological brines was described with reference to specific examples of compositions and technological steps. It is understood, however, that these compositions and process steps were given only as examples and that any changes and modifications are possible within the scope of the attached patent claims. For examples, the units of the synthesis equipment may vary, depending on specific conditions. The brines may be taken from different sources. The sorbents obtained by the method of the invention may find different applications, and the synthesis of the sorbents can be conducted at different temperatures selected according to specific conditions. Various acids can be used in the method.

The invention claimed is:

1. A method of producing inorganic sorbents for extracting lithium from lithium-containing natural and technological brines, the method comprising the steps of:
   contacting a soluble niobate (V) with an acid in the presence of at least one zirconium (IV) salt to obtain a precipitate of a mixed hydrated niobium and zirconium oxide, which is a non-stoichiometric compound;
   granulating the obtained precipitate of a mixed hydrated niobium and zirconium oxide by freezing with subsequent defreezing to obtain a granulated mixed hydrated niobium and zirconium oxide;
   converting the obtained granulated mixed hydrated niobium and zirconium oxide into a Li-form of the granulated mixed hydrated niobium and zirconium oxide by treating the granulated mixed hydrated niobium and zirconium oxide with a lithium-containing compound selected from the group consisting of a solution of lithium hydroxide LiOH and a solution of $Li_2CO_3$;
   calcining the Li-form of the granulated mixed hydrated niobium and zirconium oxide to obtain a granulated mixed lithium, niobium, and zirconium oxide, which comprises a tripled mixed oxide, which is a Li-form of an inorganic ion-exchanger; and
   converting the obtained granulated mixed lithium, niobium, and zirconium oxide to an ion-exchanger in an H-form by treating the granulated mixed lithium, niobium, and zirconium oxide with an acid solution.

2. The method of claim 1, wherein the step of contacting a soluble niobate (V) with an acid in the presence of at least one zirconium (IV) salt is carried out with an ion ratio of niobium (V) to zirconium (IV) in the soluble niobate and at least one zirconium (IV) salt, respectively, is in the range of (1 to 0.1) to (1 to 0.7).

3. The method according to claim 2, wherein the soluble niobate (V) is an alkali metal orthoniobate.

4. The method according to claim 3, wherein the alkali metal orthoniobate is selected from the group consisting of $Li_3NbO_4$, $Na_3NbO_4$, $K_3NbO_4$, $Rb_3NbO_4$, and $Cs_3NbO_4$.

5. The method of claim 4, wherein the at least one zirconium (IV) salt is selected from the group consisting of zirconium (IV) oxychloride $ZrOCl_2$, zirconium (IV) tetrachloride $ZrCl_4$, zirconium (IV) oxysulfate $ZrOSO_4$, and zirconium (IV) sulfate $Zr(SO_4)_2$.

6. The method according to claim 5, wherein the step of converting the obtained granulated mixed hydrated niobium and zirconium oxide into a is carried out with concentration of the lithium-containing compound in the rage of 0.05 M to 0.2 M.

7. The method according to claim 5, wherein the step of calcining the Li-form of the granulated mixed hydrated niobium and zirconium oxide to obtain a granulated mixed lithium, niobium, and zirconium oxide, which comprises a tripled mixed oxide and is a Li-form of an inorganic ion-exchanger, is carried out at a temperature in the range of 450° C. to 600° C.

8. The method according to claim 4, wherein the step of freezing is carried out at a temperature in the range of −3° C. to −10° C. during time from 20 hours to 40 hours.

9. The method according to claim 3, wherein the at least one zirconium (IV) salt is selected from the group consisting of zirconium (IV) oxychloride $ZrOCl_2$, zirconium (IV) tetrachloride $ZrCl_4$, zirconium (IV) oxysulfate $ZrOSO_4$, and zirconium (IV) sulfate $Zr(SO_4)_2$.

10. The method according to claim 9, wherein the step of freezing is carried out at a temperature in the range of −3° C. to −10° C. during time from 20 hours to 40 hours.

11. The method according to claim 2, wherein the step of converting the obtained granulated mixed hydrated niobium and zirconium oxide into a is carried out with concentration of the lithium-containing compound in the rage of 0.05 M to 0.2 M.

12. The method according to claim 2, wherein the step of calcining the Li-form of the granulated mixed hydrated niobium and zirconium oxide to obtain a granulated mixed lithium, niobium, and zirconium oxide, which comprises a tripled mixed oxide and is a Li-form of an inorganic ion-exchanger, is carried out at a temperature in the range of 450° C. to 600° C.

13. The method according to claim 1, wherein the soluble niobate (V) is an alkali metal orthoniobate.

14. The method according to claim 13, wherein the alkali metal orthoniobate is selected from the group consisting of $Li_3NbO_4$, $Na_3NbO_4$, $K_3NbO_4$, $Rb_3NbO_4$, and $Cs_3NbO_4$.

15. The method according to claim 1, wherein the at least one zirconium (IV) salt is selected from the group consisting of zirconium (IV) oxychloride $ZrOCl_2$, zirconium (IV) tetrachloride $ZrCl_4$, zirconium (IV) oxysulfate $ZrOSO_4$, and zirconium (IV) sulfate $Zr(SO_4)_2$.

16. The method according to claim 1, wherein the step of freezing is carried out at a temperature in the range of −3° C. to −10° C. during time from 20 hours to 40 hours.

17. The method according to claim 1, wherein the step of converting the obtained granulated mixed hydrated niobium and zirconium oxide into a is carried out with concentration of the lithium-containing compound in the rage of 0.05 M to 0.2 M.

18. The method according to claim 1, wherein the step of calcining the Li-form of the granulated mixed hydrated niobium and zirconium oxide to obtain a granulated mixed lithium, niobium, and zirconium oxide, which comprises a tripled mixed oxide and is a Li-form of an inorganic ion-exchanger, is carried out at a temperature in the range of 450° C. to 600° C.

\* \* \* \* \*